US010972206B1

(12) United States Patent
Calvert et al.

(10) Patent No.: US 10,972,206 B1
(45) Date of Patent: Apr. 6, 2021

(54) SYSTEMS AND METHODS FOR GENERATING PLAYLIST FOR A VEHICLE

(71) Applicant: Rovi Guides, Inc., San Jose, CA (US)

(72) Inventors: Peter Jason Calvert, Limerick, PA (US); Christopher Lidaka, Apex, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/810,065

(22) Filed: Mar. 5, 2020

(51) Int. Cl.
| | |
|---|---|
| *H04B 1/3822* | (2015.01) |
| *G08G 1/0968* | (2006.01) |
| *H04H 60/54* | (2008.01) |
| *G06F 3/16* | (2006.01) |
| *H04H 60/27* | (2008.01) |
| *H04W 4/40* | (2018.01) |
| *H04W 4/024* | (2018.01) |
| *H04W 4/02* | (2018.01) |
| *H04H 20/62* | (2008.01) |

(52) U.S. Cl.
CPC ............ *H04H 60/54* (2013.01); *G06F 3/165* (2013.01); *H04H 20/62* (2013.01); *H04H 60/27* (2013.01); *H04W 4/023* (2013.01); *H04W 4/024* (2018.02); *H04W 4/40* (2018.02)

(58) Field of Classification Search
CPC ............... H04N 21/236; H04N 21/258; H04N 21/25891; H04N 21/26208; H04N 21/26258; H04N 21/4786
USPC ....... 455/3.01, 41.2, 456.3; 700/94; 709/224
See application file for complete search history.

(56) References Cited

U.S. PATENT DOCUMENTS

| | | | |
|---|---|---|---|
| 8,751,293 B2 | 6/2014 | Hall et al. | |
| 8,818,618 B2* | 8/2014 | Follmer | G06Q 10/10 701/33.4 |
| 9,893,825 B1* | 2/2018 | Rao | H04W 4/46 |
| 10,313,714 B2 | 6/2019 | Logan | |
| 2003/0231163 A1* | 12/2003 | Hanon | G06F 3/0489 345/156 |
| 2003/0231208 A1* | 12/2003 | Hanon | G06F 3/048 715/764 |
| 2005/0172230 A1* | 8/2005 | Burk | B60K 35/00 715/716 |
| 2006/0239501 A1 | 10/2006 | Petrovic et al. | |

(Continued)

FOREIGN PATENT DOCUMENTS

WO   WO 2013132449   9/2013

OTHER PUBLICATIONS

U.S. Appl. No. 16/810,060, filed Mar. 5, 2020, Peter Jason Calvert.

(Continued)

*Primary Examiner* — Tan H Trinh
(74) *Attorney, Agent, or Firm* — Haley Guiliano LLP

(57) ABSTRACT

Methods and systems are employed for selectively controlling the presentation of broadcast content item in which a unique set of broadcast content items are presented based on the selection of a content type and a selection of a geography for each content type to control the manner in which broadcast content types are recorded and/or presented for the vehicle. In some embodiments, methods and systems are employed for providing relevant information to a vehicle based on receiving multiple broadcast streams, and separating the broadcast content items into segments based on a variety of content types along a predicted path of the vehicle.

20 Claims, 10 Drawing Sheets

(56) References Cited

U.S. PATENT DOCUMENTS

| | | | |
|---|---|---|---|
| 2007/0039018 A1* | 2/2007 | Saslow | G06Q 30/02 725/22 |
| 2008/0092168 A1 | 4/2008 | Logan et al. | |
| 2008/0156173 A1 | 7/2008 | Bauer | |
| 2010/0082568 A1 | 4/2010 | Lee et al. | |
| 2010/0178938 A1* | 7/2010 | Ingrassia, Jr. | H04H 60/51 455/456.3 |
| 2010/0291861 A1* | 11/2010 | Anzures | H04H 60/35 455/3.01 |
| 2010/0292816 A1* | 11/2010 | Anzures | G06Q 30/02 700/94 |
| 2011/0209062 A1* | 8/2011 | Faenger | G06F 16/435 715/716 |
| 2011/0314388 A1 | 12/2011 | Wheatley | |
| 2011/0320021 A1 | 12/2011 | Tahara et al. | |
| 2013/0287212 A1* | 10/2013 | Marko | H04H 20/74 381/2 |
| 2014/0236423 A1* | 8/2014 | Alexander | B60W 50/08 701/36 |
| 2014/0279764 A1* | 9/2014 | Lahr | G06N 5/04 706/12 |
| 2014/0281835 A1* | 9/2014 | Milbar | H04L 1/0057 714/776 |
| 2014/0302774 A1* | 10/2014 | Burke | H04W 4/08 455/3.05 |
| 2015/0188967 A1 | 7/2015 | Paulauskas et al. | |
| 2015/0365725 A1 | 12/2015 | Belyaev et al. | |
| 2016/0065441 A1* | 3/2016 | Besehanic | H04N 21/2402 709/224 |
| 2016/0098412 A1 | 4/2016 | Davidsson et al. | |
| 2016/0119661 A1 | 4/2016 | Jonnadula et al. | |
| 2016/0196345 A1 | 7/2016 | Kreifeldt | |
| 2016/0197967 A1 | 7/2016 | Kreifeldt et al. | |
| 2016/0211932 A1* | 7/2016 | Schmauderer | H04H 40/45 |
| 2016/0224846 A1* | 8/2016 | Cardno | H04N 5/247 |
| 2016/0352712 A1* | 12/2016 | Tamp | H04L 63/102 |
| 2017/0001564 A1* | 1/2017 | Bollea | G06K 9/00825 |
| 2017/0021282 A1* | 1/2017 | Comploi | B60W 50/10 |
| 2017/0032402 A1* | 2/2017 | Patsiokas | G06Q 30/0261 |
| 2017/0113683 A1* | 4/2017 | Mudalige | B60W 30/18145 |
| 2017/0278179 A1 | 9/2017 | Perrier et al. | |
| 2017/0289598 A1* | 10/2017 | Labsky | H04N 21/4786 |
| 2017/0289616 A1 | 10/2017 | Igarashi et al. | |
| 2018/0024810 A1* | 1/2018 | Vartakavi | G06F 3/165 700/94 |
| 2018/0033300 A1* | 2/2018 | Hansen | G08G 1/096844 |
| 2018/0175953 A1* | 6/2018 | Rao | H04W 4/46 |
| 2018/0236361 A1 | 8/2018 | Ninoles et al. | |
| 2018/0246517 A1* | 8/2018 | Costa | B60W 30/0953 |
| 2018/0365250 A1* | 12/2018 | Maharajh | H04L 65/4076 |
| 2019/0226862 A1* | 7/2019 | Shaukat | B60W 40/08 |
| 2019/0333378 A1* | 10/2019 | Iuzifovich | G06K 9/00785 |
| 2019/0337512 A1* | 11/2019 | Tahmasbi-Sarvestani | G06K 9/00791 |
| 2020/0068040 A1* | 2/2020 | Kim | H04L 67/306 |
| 2020/0122588 A1* | 4/2020 | Cserna | B60L 7/10 |
| 2020/0258306 A1* | 8/2020 | Forutanpour | G06T 19/006 |
| 2020/0304972 A1* | 9/2020 | Gross | H04M 1/72522 |

OTHER PUBLICATIONS

U.S. Appl. No. 16/810,067, filed Mar. 5, 2020, Peter Jason Calvert.
U.S. Appl. No. 16/826,535, filed Mar. 23, 2020, Peter Jason Calvert.
U.S. Appl. No. 16/826,780, filed Mar. 23, 2020, Peter Jason Calvert.
U.S. Appl. No. 16/913,693, filed Jun. 26, 2020, Peter Jason Calvert.
U.S. Appl. No. 16/913,694, filed Jun. 26, 2020, Peter Jason Calvert.
U.S. Appl. No. 16/945,134, filed Jul. 31, 2020, Peter Jason Calvert.
U.S. Appl. No. 16/945,140, filed Jul. 31, 2020, Peter Jason Calvert.

* cited by examiner

SYSTEMS AND METHODS FOR GENERATING PLAYLIST FOR A VEHICLE

BACKGROUND

This invention relates to systems and methods for receiving multiple broadcast streams, separating the streams into segments, and selectively providing the segments over a network for in-vehicle use.

SUMMARY

A vehicle's entertainment system may be tuned to a radio of the vehicle manually to locally available broadcast sources. For example, the user may tune a radio to a first station playing music, and then manually tune the radio to a second station playing talk radio and then manually tune the radio to a third station playing news, all while limited by the broadcast range of the locally available broadcast sources and the strength of the signal from the antennas that transmit their signal. The user is limited to the number of stations and the type of content that can be presented in the vehicle's entertainment system from locally available broadcast sources.

In another scenario, a vehicle's entertainment system, while tuned to a local radio station, is limited to the content being broadcasted. Although the vehicle's entertainment system may be manually tuned to another locally available broadcast source, the vehicle's entertainment system is limited to providing a specific broadcast radio segment of relevant information to a vehicle (e.g., weather report, traffic report). For example, while on a trip from Northern New Jersey to Southern New Jersey, to access a traffic report and a weather-related report in broadcast content (e.g., traffic and weather reports from local radio stations), a user of a vehicle's entertainment system may tune the radio to a local radio station and have to wait for the traffic and weather announcements. In some cases, the local radio station may report traffic only once an hour or even less often, and in other cases, the local station may not report traffic related to the travel route of vehicle (i.e., it may report only NYC traffic while the vehicle is in Northern New Jersey). In another example, the user while traveling along a predicted path from Durham, N.C. to New York City, may listen to a local station for local traffic and weather announcements in Durham, but is unable to listen to uninterrupted broadcast as the vehicle travels along the predicted path to New York City without manually searching for stations proximate to the predicted path. The user will be limited to searching for locally available broadcast sources based on the location of the vehicle, the topography and the signal strength.

In yet another scenario, a vehicle's entertainment system may be able to be manually tuned to locally available broadcast sources, however, it is limited by the quality and signal strength provided by that locally available broadcast source. Often a song played over the radio has interference (e.g., poor signal strength, loss of signal, co-channel interference) that diminishes the quality of the broadcast of the song. Many radio stations include radio hosts talking over parts of a song, which further can at-times reduce the enjoyment of the listening experience for a user or occupant of the vehicle. Furthermore, a signal loss, while the vehicle is in motion, can further reduce the quality of the song and decrease the enjoyment of the song.

To overcome these problems, methods and systems are disclosed herein for generating a unique playlist for a vehicle: the system receives multiple broadcast content items, and separates the broadcast content items into segments based on a variety of content types (e.g., music broadcast, news broadcast, traffic broadcast, etc.) and different geographical areas (e.g., New Jersey, California, Texas, etc.), and selectively provides the segments over a network to a vehicle to enhance the listening experience for a user or occupant of the vehicle.

In accordance with one approach, methods and systems are employed for selectively controlling the presentation of broadcast content item in which a unique set of broadcast content items are presented based on the selection of a content type and a selection of a geography for each content type to control the manner in which broadcast content types are recorded and/or presented for a user or occupant of the vehicle.

In some embodiments, the methods include generating a unique playlist for a vehicle based on a variety of content types (e.g., music broadcast, news broadcast, traffic broadcast, etc.) and different geographical areas (e.g., New Jersey, California, Texas, etc.). For example, the system employs metadata created at a central location for shared use by connected vehicles, to improve the enjoyment of variety of available broadcast programming content from a variety of geographical areas. A variety of mechanisms are employed for automatically identifying and designating broadcast programming content items, associating descriptive metadata with the identified content items, determining a geographical origin of the metadata associated with the identified content items, generating a playlist of metadata for use in a vehicle based on a selection of a combination of content type and geographical origin, and playing the playlist based on the desired selection in the vehicle.

The broadcast content type is recorded from all broadcast stations in the country and processed to determine a geographical location and a content type. For example, a broadcast of country music from a local radio station in Austin, Tex. is recorded and is processed to determine the type of content, (e.g., country music) and the geographical location (e.g., Austin, Tex.). Advantageously, such an improvement to in-vehicle entertainment systems can improve the listening experience of the vehicle's occupants (e.g., music from Austin, news from Denver, traffic report from Austin, advertisements from Austin) without requiring any additional input from the user, generating a unique playlist.

In some embodiments, all broadcast content items (e.g., recording of a radio station broadcast) are divided up into many broadcast segments (e.g., a particular song, news story, traffic report, podcast, talk radio segment, etc.). Each broadcast segment is processed to determine the content type and geographical origin. Accordingly, each broadcast segment is associated with metadata that identifies content type and geographical origin of that broadcast segment.

In response to a selection that includes a first combination of content type (e.g., music, news, podcast, talk radio, etc.) and geographical origin (e.g., Texas, Austin, Boston, NYC, Denver, etc.) and a second combination of content type (e.g., music, news, podcast, talk radio, etc.) and geographical origin (e.g., Texas, Austin, Boston, NYC, Denver, etc.) a playlist of the first combination and the second combination is generated. For example, a first broadcast content item is selected for the playlist that includes metadata of the first broadcast segment that matches the first combination of content type and geographical origin. Further, a second broadcast content item is selected for the playlist that includes metadata of the second broadcast segment that matches the second combination of content type and geographical origin.

Based on the selection of the first combination and the second combination, the system generates a playlist that includes metadata of the first broadcast segment that matches the first combination and the second broadcast segment that matches the second combination. The playlist is presented in the vehicle for an enhanced and improved listening experience, where each of the broadcast segments (e.g., first broadcast segment, second broadcast segment, etc.) is played consecutively and seamlessly.

In accordance with another approach, methods and systems are disclosed herein for providing relevant information to a vehicle based on receiving multiple broadcast streams, separating the broadcast content items into segments based on a variety of content types (e.g., traffic report, weather report, etc.) along a predicted path of the vehicle, and selectively providing the segments over a network for in-vehicle use to enhance and improve the listening experience.

In accordance with one embodiment, methods and systems are employed for selectively controlling the presentation of broadcast content items in which a unique set of broadcast content items are presented based on a selection of a content type (e.g., traffic report and weather report) and a predicted path of the vehicle to control the manner in which broadcast content items are recorded and/or presented for the vehicle.

In some embodiments, the methods include providing relevant information to a vehicle based on a variety of content types (e.g., weather broadcast, news broadcast, traffic broadcast, etc.) and along a predicted path of the vehicle (e.g., directions from southern New Jersey to New York City). For example, the system employs metadata created at a central location for shared use by connected vehicles, to improve the enjoyment of a variety of available broadcast programming content from a variety of geographical areas. A variety of mechanisms are employed for automatically identifying and designating broadcast content items, associating descriptive metadata with the identified broadcast content items, determining a geographical origin of the metadata associated with the identified content items, generating relevant information to the vehicle based on a selection of content type and geographical proximity of the information to a predicted path of the vehicle, and causing presentation of the identified broadcast content items in the vehicle based on the desired selection in the vehicle. For example, as the vehicle is driving through a part of Philadelphia, a local radio station provides a traffic report that describes traffic that is proximate to the geographical location of the vehicle, and the system presents this traffic report to the user of the vehicle to enhance the driving experience and avoid distracted driving. In some embodiments, the method provides an on-demand presentation of traffic reports (e.g., local traffic) based on the geographical proximity of the information to a predicted path of the vehicle.

The broadcast content type is recorded from all broadcast stations in the country and is processed to determine a geographical location and a content type. For example, a broadcast of traffic report from a local radio station north of Austin, Tex. is recorded and is processed to determine the type of content, (e.g., traffic report) and the geographical location, (e.g., Austin, Tex.). Advantageously, this enhanced and improved system can provide a variety of broadcast segments spliced (i.e., joined) together to provide the most current and relevant information (in the form of a traffic report from a local radio station) for the user of the vehicle while the vehicle is travelling along a predicted path, without requiring any additional input from the user.

In some embodiments, all broadcast content items (e.g., recording of a radio station's broadcasts) are divided up into many broadcast segments (e.g., a particular song, a news story, traffic report, podcast, talk radio segment, etc.). Each broadcast segment is processed to determine the content type and geographical origin. Further, geographical markers (e.g., a town, road, landmark) mentioned in a news report or traffic report can be tagged for presentation. In such an aspect, as the vehicle is travelling along a predicted path, the system determines a traffic report (e.g., "local traffic") that mentions a town through which the vehicle is predicted to travel and generates the broadcast content item for presentation in the vehicle to alert a user or occupant of the vehicle. For example a ride from the Philadelphia area to Durham, selecting local traffic option permits a latest local traffic report captured from several local stations to be presented. Accordingly, each broadcast segment is processed to determine, and associated with metadata that identifies, content type and geographical origin of that broadcast segment.

In response to identifying a predicted path of the vehicle (e.g., route from geographical location to destination) and identifying a geographical location proximate to the predicted path, the system may search for and identify broadcast segments with metadata that matches the identified geographical location along the predicted path. For example, as the vehicle approached Philadelphia, the system may search for traffic reports describing traffic along the predicted path of the vehicle from local radio stations.

Based on identifying a broadcast content item that matches the identified geographical location along the predicted path of the vehicle and the content type, the system presents to the vehicle the identified broadcast segment. The relevant information is presented in the vehicle for an enhanced and improved listening experience where the identified broadcast segment is spliced in between other entertainment.

In accordance with another approach, methods and systems are disclosed herein for generating a playlist for a vehicle based on receiving multiple broadcast streams, separating the streams into segments based on a quality indices, and selectively providing the highest-quality segments over a network for in-vehicle use to enhance and improve the listening experience for a user or occupant of the vehicle.

In some embodiments, the methods include generating a playlist for a vehicle based on a selection of music. The broadcast content type is recorded from all broadcast stations in the country and processed to determine a geographical location and a content type. The system may perform processing to determinate that a first broadcast segment of the plurality of broadcast segments and a second broadcast segment of the plurality of broadcast segments correspond to the same content item. For example, a broadcast of specific song (e.g., "Hello" by Adele) is recorded from two stations, one in Atlanta and a second in Denver, and both are recorded and processed to determine the quality indices (e.g., poor signal strength, loss of signal, co-channel interference). Each of the first broadcast segment and the second broadcast segment is updated to include metadata with a corresponding quality index indicative of the quality of the recording.

In response to a request to play the song (e.g., "Hello" by Adele), the system selects one of the first broadcast segment or the second broadcast segment, based on their respective quality indices and provides the selected broadcast segment for presentation in the vehicle. For example, if the system determines that the recording from Atlanta includes, significant talk-over and the song is shorter than the original, the system will select the song from Denver for presentation. Advantageously, this enhanced and improved system can provide highest-quality recording for presentation and enjoyment by the user or occupant of the vehicle without requiring any additional input from the user or occupant of the vehicle.

The specific features and advantages of the present invention may be more clearly understood by considering the additional detailed description of embodiments and examples of the invention. In the course of this description, frequent reference will be made to the attached drawing.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are disclosed herein for automatically providing broadcast content in a vehicle. In one embodiment, a method generates a unique playlist for a vehicle based on a variety of content types and geographical areas. In another embodiment, a method provides relevant information to a vehicle based on a variety of content types along a predicted path of the vehicle. In yet another embodiment, a method generates a playlist for a vehicle based on a quality index.

As used herein, "a vehicle content interface application" refers to a form of content through an interface that facilitates access to audio, music, news and podcast content on one or more display devices operating within the vehicle. In some embodiments, the vehicle content interface application may be provided as an online application (i.e., provided on a website), or as a stand-alone application on a server, user device, etc. The vehicle content interface application may also communicate with a vehicle antenna array or telematics array to receive content via a network. Various devices and platforms that may implement the vehicle content interface application are described in more detail below. In some embodiments, the vehicle content interface application and/or any instructions for performing any of the embodiments discussed herein may be encoded on computer-readable media. Computer-readable media includes any media capable of storing instructions and/or data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Figure 1:
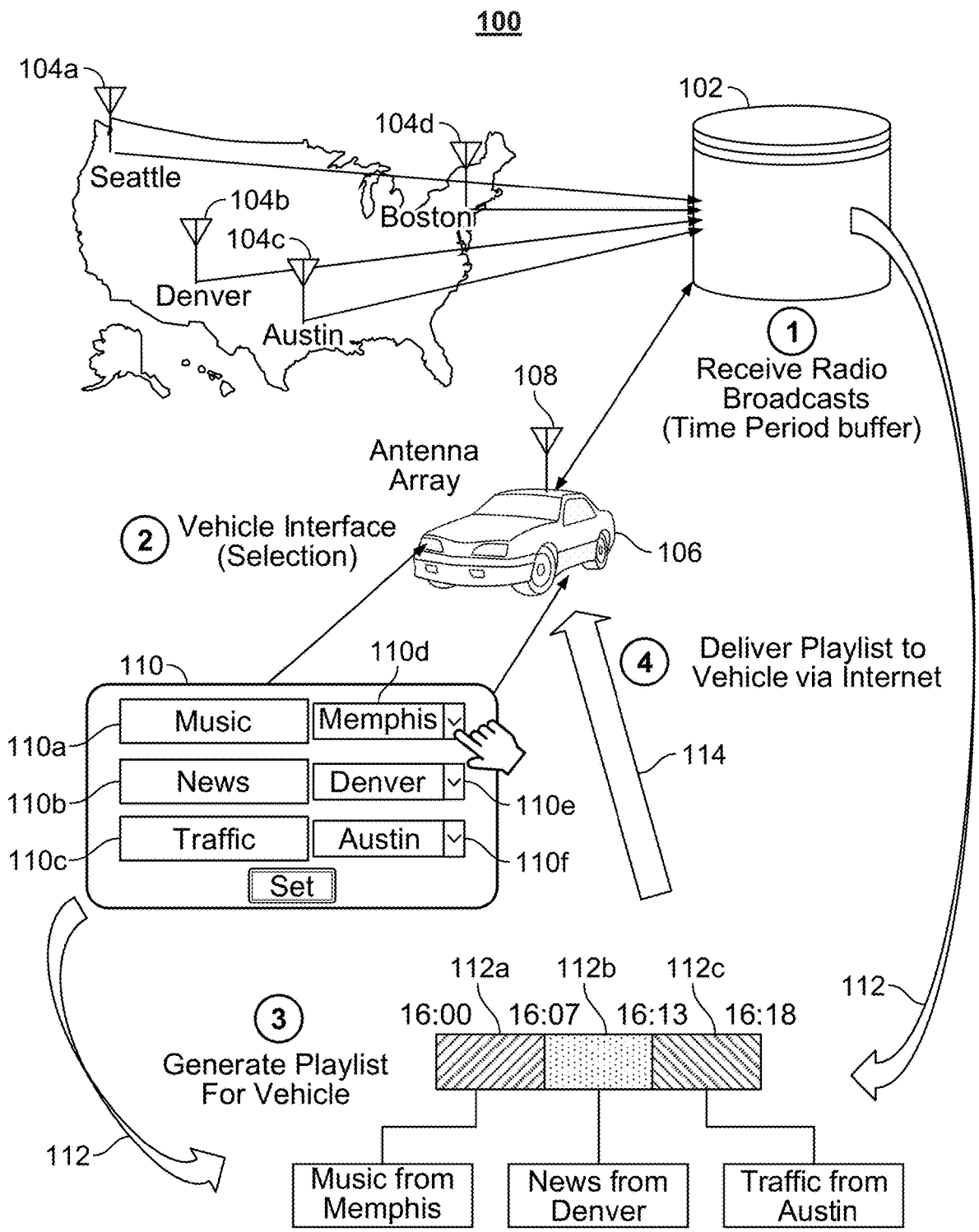
FIG. 1 shows an illustrative example of a scenario for generating a playlist for a vehicle based on a variety of content types and geographical origins, in accordance with one embodiment.

FIG. 1 shows an illustrative example for generating a playlist based on variety of content types and geographical origins that are available to a user or occupant of the vehicle 106. In one embodiment, as shown in FIG. 1, a system 100 includes an array of antennas (104a, 104b, 104c, 104d . . . 104n) vehicle 106 with antenna array 108 having a vehicle interface 110. The array of antennas 104a . . . 104n can receive all broadcast sources content items from the entire country or broadcast the content items. The arrays of antennas (104a, 104b, 104c, 104d . . . 104n) are receiver, and function as a way to receive or broadcast signals. According to an embodiment, the arrays of antennas may communicate over a wireless network that includes a wireless network that operates according to a 5G specification or standard. In another embodiments, wireless network includes a wireless network that operates according to a specification or a standard other than a 5G specification or standard. For example, wireless network may operate as a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution Data Optimized (EV-DO) network, a Universal Mobile Telecommunications System (UMTS) network, or some other type of wireless network (e.g., an ad hoc network, a non-land-based wireless network, etc.). According to an exemplary implementation, wireless network 105 includes a radio access network (RAN) and a core network. Database 102 can store all received or broadcasted content items from the broadcast content sources. Database can include a server or a collection of servers designed to receive and store the broadcast content items. Broadcast content sources can include over-the-air digital signals or over-theair analog signals. The system may be provided for converting over-the-air, analog, or digital signals to MPEG signals for storage).

Vehicle 106 can perform a selection via user interface 110, generation of a playlist 112 based on the selection and the received broadcast sources, and present the playlist 114 in the vehicle via antenna array 108. In one embodiment, as shown in FIG. 1, the system includes generating a unique playlist for a vehicle based on received multiple broadcast streams, and separating the streams into segments based on a variety of content types (e.g., music broadcast, news broadcast, traffic broadcast, etc.) and different geographical areas (e.g., New Jersey, California, Texas, etc.), and selectively providing the segments over a network for in-vehicle use to enhance and improve the listening experience. The system receives a plurality of broadcast content items (e.g., content provided by radio stations) from a plurality of content sources. The plurality of broadcast sources are radio stations broadcasting transmission of audio (sometimes with related metadata) by radio waves intended to reach a wide audience. The system receives the plurality of broadcast content items from the entire country (e.g., USA) or a geographical area (e.g., North America) as selected by the user. In some embodiments, the system receives all broadcast content items from the entire country (e.g., USA) or a geographical area (e.g., North America) as selected by the user. The received broadcast content items can be for a time period (e.g., 30 minutes, 60 minutes or 120 minutes) or continuously recorded. For example, the system records broadcast content items for a specific time period from broadcast content sources (e.g., radio stations) for processing and use in generating the playlist. In an embodiment, after the specific time period has passed, the recorded broadcast content items are deleted. In another embodiment, the system records all broadcasts continuously and provides such recordings for processing and use in generating the playlist. The received broadcast content items are stored in a database 102 for processing and use in generating the playlist.

The system processes each of the broadcast content items by performing content recognition and geographical origin recognition to determine metadata for each broadcast content item. For example, a first broadcasts content item is processed and determined to be music from a radio station in Memphis, a second broadcasts content item is processed and determined to be a news report from Denver and a third broadcasts content item is processed and determined to be a traffic report from Austin. All broadcast content items are processed to determine a content type and a geographical origin.

The system further includes a vehicle 106 with an antenna array 108 and a user interface 110. In one embodiment, the vehicle is an autonomous vehicle, a vehicle that is capable of sensing its environment and moving safely with little or no human input. The vehicle can be an Internet-connected vehicle, a vehicle that can communicate bidirectionally with other systems outside of the vehicle. The vehicle can communicate bidirectionally via the antenna array 108 with the database 102 to facilitate generating the playlist based on the selections and the received broadcast content items. The user interface 702 may also display audio user interface element (radio tab) 110 among other user interface elements, which are discussed below with reference to FIG. 7. In one example, when display audio user interface element (radio tab) 110 is selected, the vehicle content interface application may display the user interface 110 with options for selection. For example, the user interface 110 may provide a selection for content type 110a-110c, (e.g., music type, news type, traffic type, podcast type, sports type, talk radio type, weather type, etc.) and a geographical area 110d-110f, (e.g., Boston, Memphis, Denver, Austin, etc.).

In some embodiments, a selection for content type 110a-110c and for geographical origin 110d-110f is entered in the user interface. The selection may include a first combination of content type 110a and geographical origin 110d and a second combination of content type 110b and geographical origin 110e. For example, the first combination includes a content type and a geographical origin (e.g., Music and Memphis) and the second combination of a content type and a geographical origin (e.g., News and Denver). The first combination and the second combination may include the same content type and different geographical origin, different content types and same geographical origin or different content types and different geographical origin.

The system generates the playlist 112 based on the selection 110a-110f and the received broadcast content items stored in database 102. For example, based on the selection, the system searches for metadata of a first broadcast segment that matches the first combination of content type 110a and geographical origin 110d (e.g., Music and Memphis). The system further searches for metadata of a second broadcast segment that matches the second combination of content type 110b and geographical origin 110e (e.g., News and Denver). The playlist of the first broadcast segment 112a and the second broadcast segment 112b is buffered for presentation in the vehicle.

Figure 2:
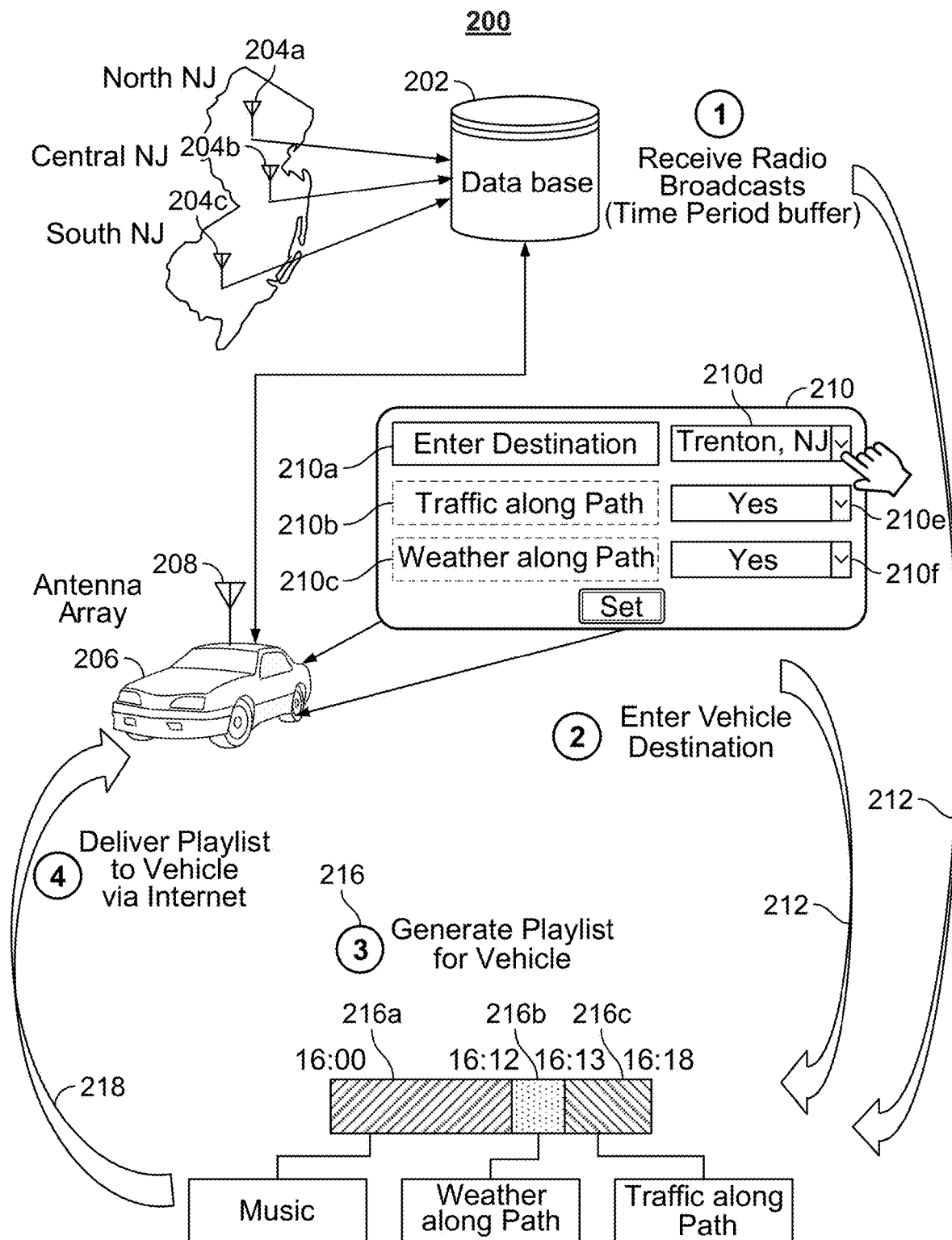
FIG. 2 shows an illustrative example of a scenario for providing relevant information for a vehicle based on variety of content type and proximity to a predicted path of the vehicle, in accordance with one embodiment.
Figure 7:
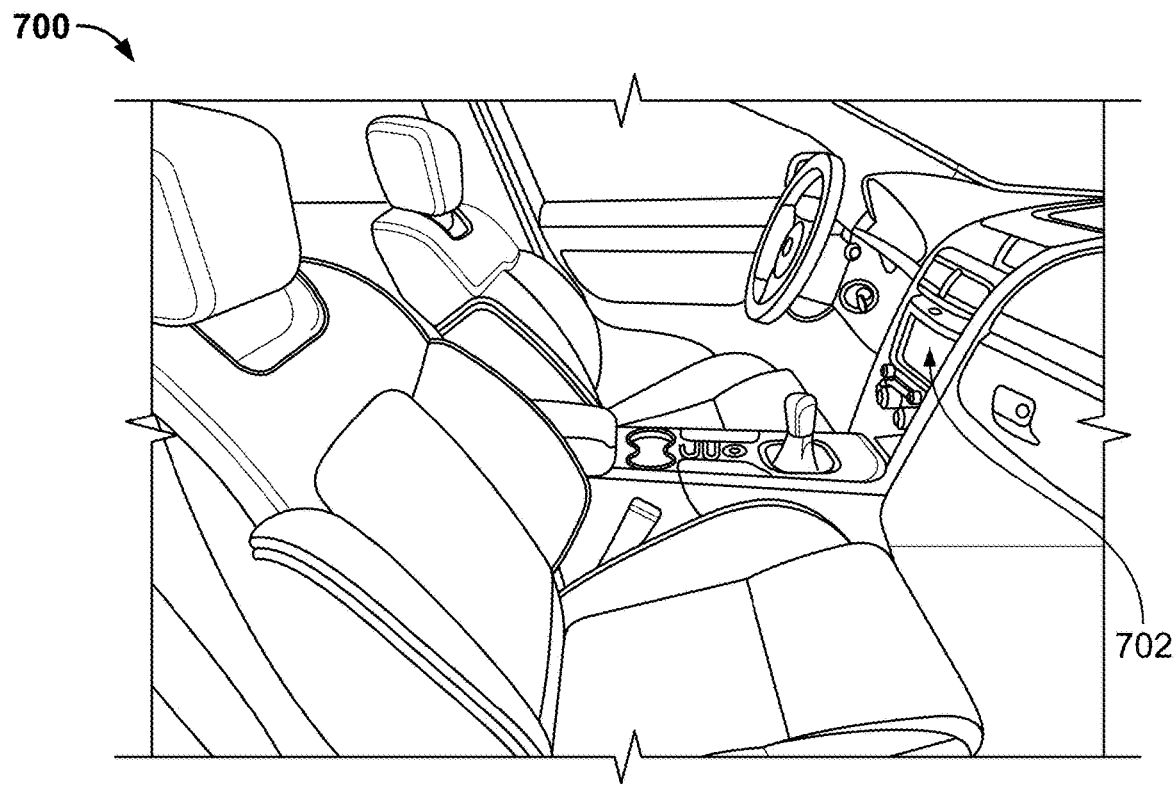
FIG. 7 depicts an illustrative example of a vehicle featuring a content display, in accordance with one embodiment.

FIG. 2 shows an illustrative example for providing relevant information to a vehicle based on variety of content types and proximity to a predicted path of the vehicle that are available to a user occupying the vehicle (e.g., vehicle 700 of FIG. 7). In one embodiment, as shown in FIG. 2, a system 200 includes an array of antennas (204a, 204b, 204c, . . . 204n) that receives signal of all broadcast content items from all broadcast content sources (e.g., broadcast radio stations), a database 202 that stores all received broadcast content items from broadcast sources, a vehicle 206 for performing a selection via user interface 210, generating a playlist 212 based on the selection and the received broadcast content items from the broadcast content sources 202a-202c and causing the playlist to be presented 218 to the vehicle. In one embodiment, as shown in FIG. 2, the system includes providing relevant information for a vehicle based on receiving multiple broadcast streams, separating the streams into segments based on a variety of content types (e.g., music broadcast, news broadcast, traffic broadcast, etc.) and identifying the predicted path of the vehicle (e.g., from Northern New Jersey to Southern New Jersey), and selectively providing the segments over a network for in-vehicle use to enhance and improve the listening experience.

The system receives a plurality of broadcast content items (e.g., content provided by radio stations) from a plurality of content sources. The plurality of broadcast sources are radio stations broadcasting transmission of audio (sometimes with related metadata) by radio waves intended to reach a wide audience. The system receives the plurality of broadcast content items from the entire country (e.g., USA) or a geographical area (e.g., North America) as selected by the user or occupant of the vehicle. In some embodiments, the system receives broadcast content items within a range of a predicted path of the vehicle as selected by the user or occupant of the vehicle. For example, the system identifies a location of the vehicle and a destination of the vehicle to identify the predicted path of the vehicle. The received broadcast content items can be for a time period (e.g., 30 minutes, 60 minutes or 120 minutes) or continuously recorded. In one embodiment, the system may record broadcast content items for a time period from broadcast content sources (e.g., radio stations) for processing and use in generating the playlist. After the time period has passed, the recorded broadcast content items can be deleted or processed for later presentation. In another embodiment, the system records all broadcasts continuously and provides such recordings for processing and use in generating the relevant information. The received broadcast content items are stored in a database 202 for processing and use in generating the playlist.

The system processes each of the broadcast content items by performing content recognition and geographical origin recognition to determine the metadata for each broadcast content item. For example, each broadcasts content item is processed to determine the content type and the geographical origin as well as proximity of geographical location to the predicted path.

The system further includes a vehicle 206 with an antenna array 208 and a user interface. In one embodiment, the vehicle is an autonomous vehicle, a vehicle that is capable of sensing its environment and moving safely with little or no human input. The vehicle can be an Internet-connected vehicle, a vehicle that can communicate bidirectionally with other systems outside of the vehicle. The vehicle can communicate bidirectionally via the antenna array 208 with the database 202 to facilitate providing relevant information based on the selections and the received broadcast content items.

The vehicle content interface component 702 may display audio user interface element (radio tab) 210 among other user interface elements, which are discussed below with reference to FIG. 7. In one example, when display audio user interface element (radio tab) 210 is selected, the vehicle content interface application may display the user interface 210 with options for selection. For example, the user interface 210 may provide a selection for destination 210a and content type 210b and 210c, (e.g., traffic type, weather type, etc.). In another example, the selected content type can include additional content types (e.g., music type, news type, traffic type, podcast type, sports type, talk radio type, weather type, etc.).

In some embodiments, the selection of content type may be optional, such that the report can be automatically generated and presented to the user or occupant of the vehicle for consumption. For example, the user or occupant of the vehicle may enter a destination for the vehicle, a predicted path may be identified, and while in transit, the system identifies a traffic report that is proximate to the predicted path, and prompts the user or occupant for an option to listen to traffic report. In some cases, the user or occupant of the vehicle can opt to receive only, for example, traffic reports and not weather reports via options 210e and 210f Further, the user or occupant of the vehicle has the option to enter a specific amount of time by which to space out the traffic reports. For example, the user can select a traffic report every 10 minutes, every 30 minutes or as frequently as a traffic report is available proximate to the predicted travel path.

In some embodiments, selections for destination 210a and 210d, content type 210b and 210c and frequency 210e and 210f are entered in the user interface of the vehicle. The selections may include a destination 210d and content type 210b and 210e and a second content type 210c and 210f For example, entering the destination of the vehicle, the system determines the predicted path of the vehicle and searches for metadata for broadcast segments that matches identified geographical locations proximate to the predicted path. The identified broadcast content items, for example, weather report 216b and traffic report 216c are delivered for presentation 218 in the vehicle. The system provides the relevant information 218 based on the selection 210a-210f and the received broadcast content items stored in database 202

Figure 3:
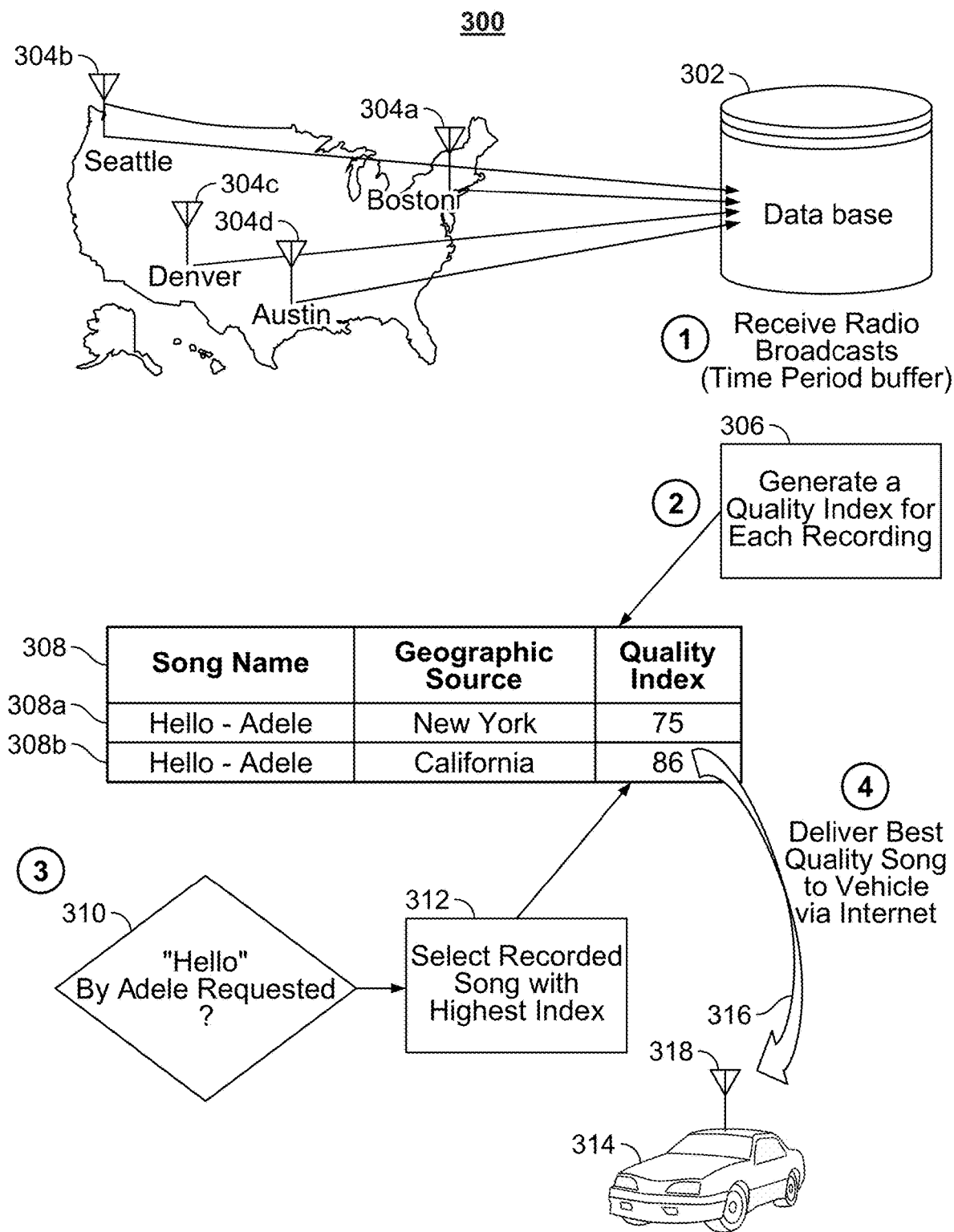
FIG. 3 shows an illustrative example of a scenario for generating a playlist based on a quality index of the songs, in accordance with one embodiment.

FIG. 3 shows an illustrative example of a scenario for generating a playlist based on quality indexes of a song that are available to a user or occupant of the vehicle (e.g., vehicle 700 of FIG. 7). In one embodiment, as shown in FIG. 3, a system 300 includes an array of antennas (304a, 304b, 304c, 304d . . . 304n) that receive signal of broadcast content items from all broadcast content sources, a database 302 that stores all received broadcast content items, a vehicle 314 with an antenna 318 for performing a selection via user interface 308, a selection of a particular song (e.g., "Hello" by Adele) from a user or occupant of the vehicle. Based on the selection, the system searches for the song (e.g., "Hello" by Adele) from the broadcast content items stored in the database 302. In response to finding the song from multiple sources, a first broadcast segment 308a and a second broadcast segment 308b (e.g., radio station from New York and radio station from California) the system generates a quality index 306 for each broadcast content item and updates each with metadata to include the quality index that is indicative of the recording quality of that broadcast content item. For example, each broadcast content item is compared to an original recording to determine the quality index based on signal strength, loss of signal, co-channel interference, excessive talk over song. The system presents for presentation a selection via user interface 308, the broadcast content item (e.g., song) with the quality index and the geographical source corresponding to each broadcast content item.

The system selects one of the first broadcast segment 308a or the second broadcast segment 308b based on their respective quality indices and provides the selected broadcast segment for presentation in the vehicle. For example, the system determines that the quality index of the broadcast content item from New York is lower than that of the broadcast content item from California it has because it has significant talk over, or being shorter than the original recording, the system will select the broadcast content item from California for presentation with a higher quality index. Advantageously, this enhanced and improved system provides the highest-quality recording for presentation and enjoyment by the user or occupant of the vehicle without requiring any additional input from the user.

Figure 4:
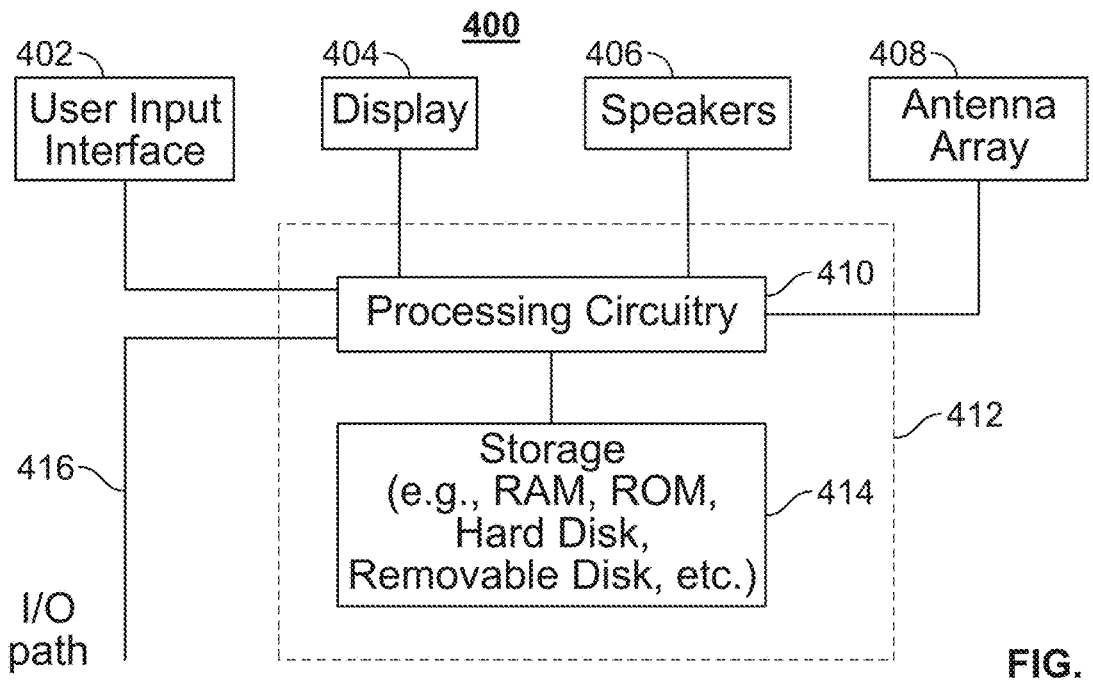
FIG. 4 depicts a block diagram of an illustrative example of a user equipment device, in accordance with one embodiment.

User or occupant in a vehicle may access content and the vehicle content interface application (and its display screens described above and below) from one or more of their user equipment devices. FIG. 4 shows a generalized embodiment of illustrative user equipment device 400. More specific implementations of user equipment devices are discussed above in connection with FIG. 4. User equipment device 400 may receive content and data via input/output (hereinafter "I/O") path 416. I/O path 416 may provide content (e.g., broadcast programming, on-demand programming, Internet content, content available over a local area network (LAN) or wide area network (WAN), and/or other content) and data to control circuitry 412, which includes processing circuitry 410 and storage 414. Control circuitry 412 may be used to send and receive commands, requests, and other suitable data using I/O path 416.

Control circuitry 412 may be based on any suitable processing circuitry such as processing circuitry 410. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 412 executes instructions for a vehicle content interface application stored in memory (i.e., storage 414). Specifically, control circuitry 412 may be instructed by the vehicle content interface application to perform the functions discussed above and below. For example, the vehicle content interface application may provide instructions to control circuitry 412 to generate the audio content display. In some implementations, any action performed by control circuitry 412 may be based on instructions received from the vehicle content interface application.

In client-server-based embodiments, control circuitry 412 may include communications circuitry suitable for communicating with a content application server or other networks or servers. The instructions for carrying out the above-mentioned functionality may be stored on the content application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 5). In some embodiments, an antenna 408 is provided in the user equipment device 400. The antenna 408 may be used for communication with the network of antennas. In addition, communications circuitry may include circuitry that enables peer-to-peer communication of user equipment devices, or communication of user equipment devices in locations remote from each other (described in more detail below).

Memory may be an electronic storage device provided as storage 414 that is part of control circuitry 412. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 414 may be used to store various types of content described herein as well as content data and content application data that are described above. Nonvolatile memory may also be used (e.g., to launch a boot-up routine and other instructions). Cloud-based storage may be used to supplement storage 414 or instead of storage 414.

Control circuitry 412 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 412 may also include scaler circuitry for upconverting and down-converting content into the preferred output format of the user equipment device 400. Control Circuitry 412 may also include digital-to-analog converter circuitry and analog-to-digital converter circuitry for converting between digital and analog signals. The tuning and encoding circuitry may be used by the user equipment device to receive and to display, to play, or to record content. In some embodiments, the control circuitry may include an HD antenna.

In one embodiment, speakers 406 may be provided as integrated with other elements of user equipment device 400 or may be stand-alone units. The audio and other content displayed on display 404 may be played through speakers 406. In some embodiments, the audio may be distributed to a receiver (not shown), which processes and outputs the audio via speakers 406.

In some embodiments, a sensor (not shown) is provided in the user equipment device 400. The sensor may be used to monitor, identify, and determine vehicular data. For example, the vehicle content interface application may receive vehicular speed data from the sensor or any other vehicular status data (e.g., global positioning data of the vehicle, driving condition of the vehicle, etc.) received from any other vehicular circuitry and/or component that describes the vehicular status of the vehicle.

The vehicle content interface application may be implemented using any suitable architecture. For example, it may be a stand-alone application wholly implemented on user equipment device 400. In such an approach, instructions of the application are stored locally (e.g., in storage 414), and data for use by the application is downloaded on a periodic basis (e.g., from an out-of-band feed, from an Internet resource, or using another suitable approach). Control circuitry 412 may retrieve instructions of the application from storage 414 and process the instructions to generate any of the displays discussed herein. Based on the processed instructions, control circuitry 412 may determine what action to perform when input is received from input interface 402. For example, movement of a cursor on an audio user interface element may be indicated by the processed instructions when input interface 402 indicates that a user interface 110 was selected.

In some embodiments, the vehicle content interface application is a client-server based application. Data for use by a thick or thin client implemented on user equipment device 400 is retrieved on-demand by issuing requests to a server remote to the user equipment device 400. In one example of a client-server based content application, control circuitry 412 runs a web browser that interprets web pages provided by a remote server. For example, the remote server may store the instructions for the application in a storage device. The remote server may process the stored instructions using circuitry (e.g., control circuitry 412) and generate the displays discussed above and below. The client device may receive the displays generated by the remote server and may display the content of the displays locally on user equipment device 400. This way, the processing of the instructions is performed remotely by the server while the resulting displays are provided locally on user equipment device 400. User equipment device 400 may receive inputs from the user or occupant of the vehicle via input interface 402 and transmit those inputs to the remote server for processing and generating the corresponding displays. For example, user equipment device 400 may transmit, via antenna 408, a communication to the remote server indicating that a user interface element was selected via input interface 402. The remote server may process instructions in accordance with that input and generate a display of content identifiers associated with the selected user interface element as described in greater detail with reference to FIGS. 8, 9 and 10. The generated display is then transmitted to user equipment device 400 for presentation to the user or occupant of the vehicle.

In some embodiments, the vehicle content interface application is downloaded and interpreted or otherwise run by an interpreter or virtual machine (run by control circuitry 412). In some embodiments, the vehicle content interface application may be encoded in the ETV Binary Interchange Format (EBIF), received by control circuitry 412 as part of a suitable feed, and interpreted by a user agent running on control circuitry 412. For example, the vehicle content interface application may be an EBIF application. In some embodiments, the vehicle content interface application may be defined by a series of JAVA-based files that are received and run by a local virtual machine or other suitable middleware executed by control circuitry 412. In some of such embodiments (e.g., those employing MPEG-2 or other digital media encoding schemes), the vehicle content interface application may be, for example, encoded and transmitted in an MPEG-2 object carousel with the MPEG audio of a program.

Figure 5:
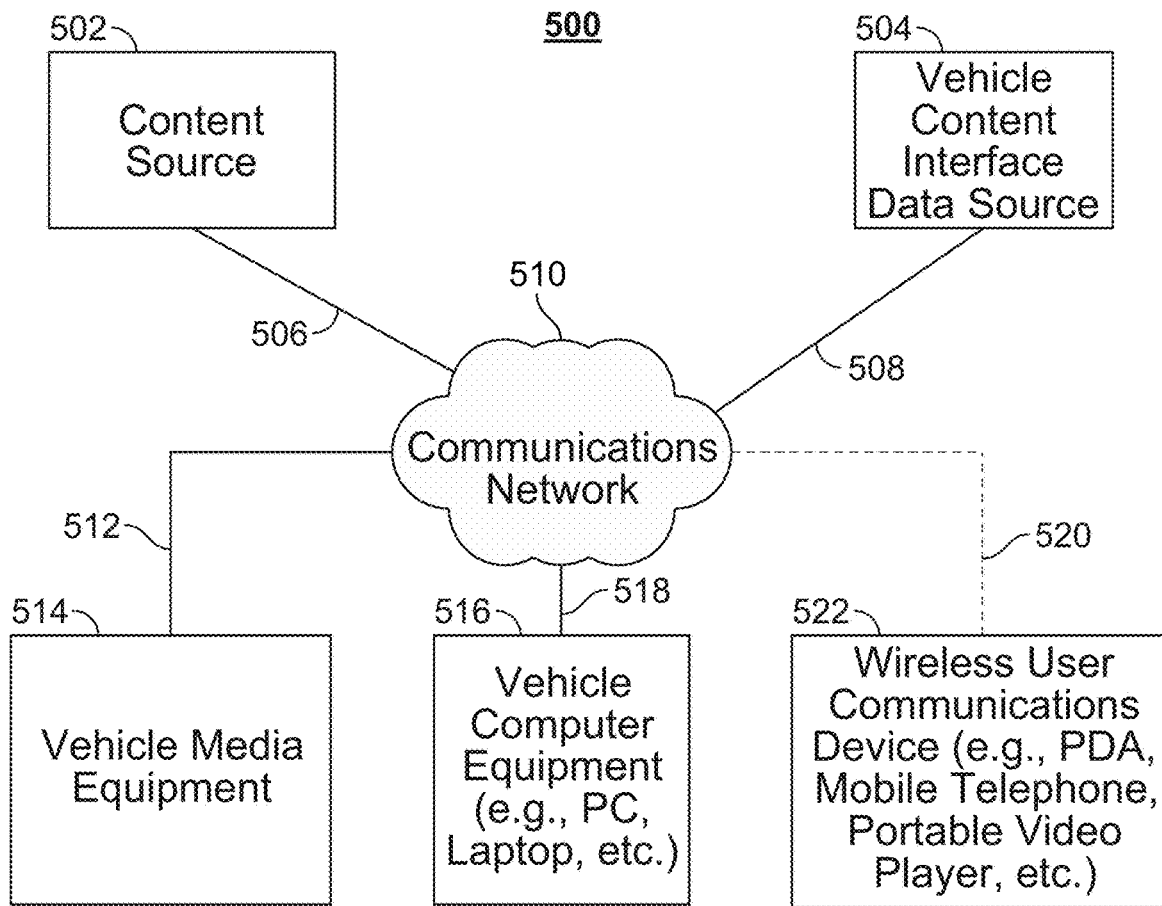
FIG. 5 depicts an example of an illustrative system implementing the user equipment device, in accordance with one embodiment.

User equipment device 400 of FIG. 4 can be implemented in system 500 of FIG. 5 as vehicle media equipment 514, vehicle computer equipment 518, wireless user communications device 522 or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a vehicle content interface application may be implemented, may function as stand-alone devices or may be part of a network of devices. Various network configurations of devices may be implemented and are discussed in more detail below.

A user equipment device utilizing at least some of the system features described above in connection with FIG. 5 may not be classified solely as vehicle media equipment 514, vehicle computer equipment 518, or a wireless user communications device 522. For example, vehicle media equipment 514 may, like some vehicle computer equipment 518, be Internet-enabled, allowing for access to Internet content, while wireless user computer equipment 522 may, like some vehicle media equipment 514, include a tuner allowing for access to media programming. The vehicle content interface application may have the same layout on various types of user equipment or may be tailored to the display capabilities of the user equipment. For example, on wireless user computer equipment 518, the vehicle content interface application may be provided as a website accessed by a web browser. In another example, the vehicle content interface application may be scaled down for wireless user communications devices 522.

The user equipment devices may be coupled to communications network 510. Communications network 510 may be one or more networks including the Internet, a mobile phone network, mobile voice or data network (e.g., a 4G, 5G or LTE network), cable network, public switched telephone network, or other types of communications network or combinations of communications networks.

System 500 includes content source 502 and vehicle content interface data source 504 coupled to communications network 510. Communications with the content source 502 and the data source 504 may be exchanged over one or more communications paths but are shown as a single path in FIG. 5 to avoid overcomplicating the drawing. Although communications between sources 502 and 504 with user equipment devices 514, 518, and 522 are shown as through communications network 510, in some embodiments, sources 502 and 504 may communicate directly with user equipment devices 514, 518, and 522.

Content source 502 may include one or more types of content distribution equipment including a media distribution facility, satellite distribution facility, programming sources, intermediate distribution facilities and/or servers, Internet providers, on-demand media servers, and other content providers. Vehicle Content Interface data source 504 may provide content data, such as the audio described above. Vehicle content interface application data may be provided to the user equipment devices using any suitable approach. In some embodiments, vehicle content interface data from vehicle content interface data source 504 may be provided to users' equipment using a client-server approach. For example, a user equipment device may pull content data from a server, or a server may present the content data to a user equipment device. Data source 504 may provide user equipment devices 514, 518 and 522 the vehicle content interface application itself or software updates for the vehicle content interface application.

Figure 6:
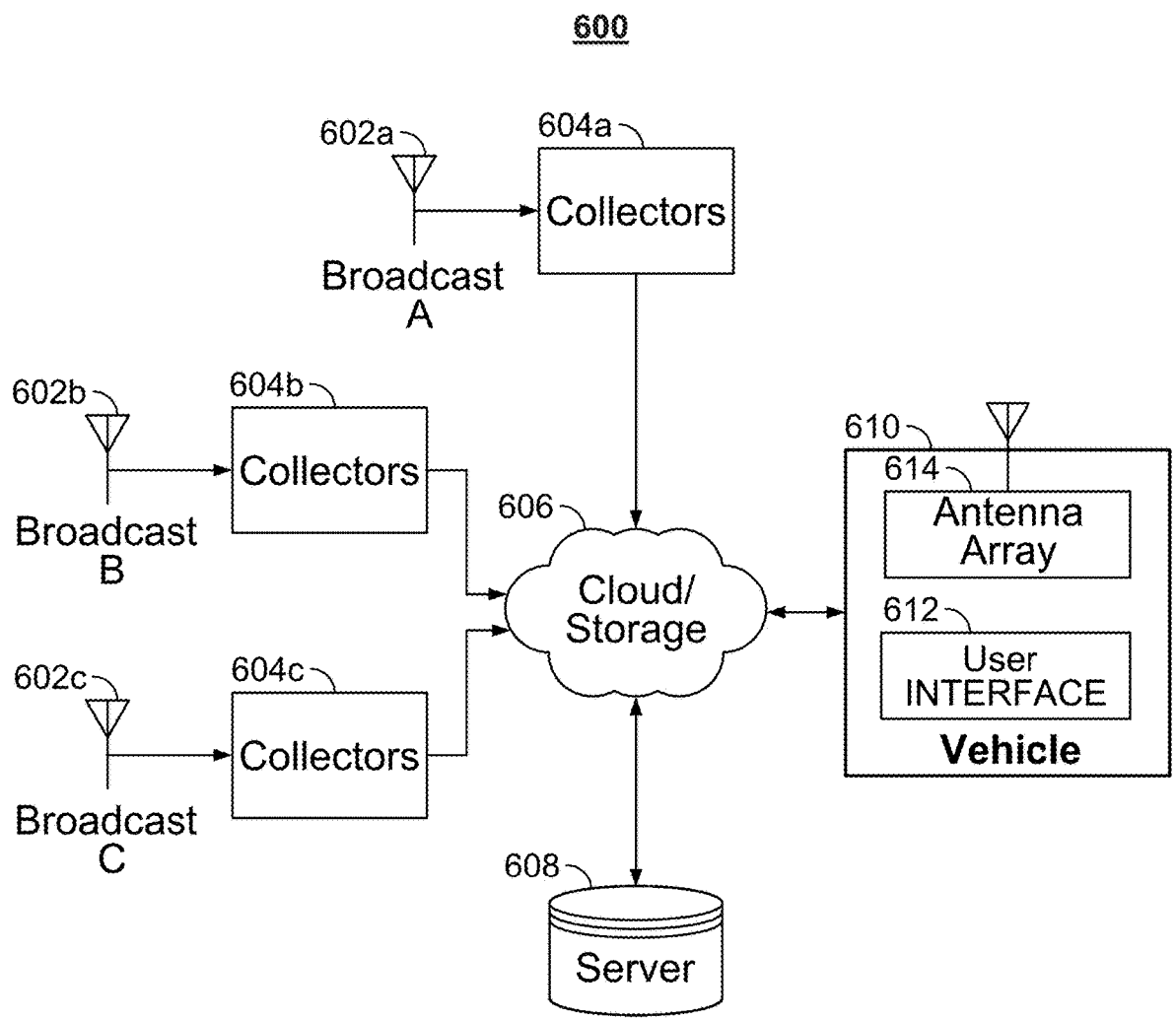
FIG. 6 depicts a block diagram of an illustrative example of a user equipment device, in accordance with one embodiment.

FIG. 6 shows a generalized embodiment of an illustrative system 600 in which user equipment device 400 of FIG. 4 and the system 500 of FIG. 5 can be implement. System 600 includes an array of antennas (e.g., 602a, 602b, 602c, 602d . . . 602n) connected to collectors (e.g., 604a, 604b, 604c, 604d . . . 604n) coupled to storage device 606, server 608 and a vehicle 610. The vehicle 610 can communicate bidirectionally with other systems outside of the vehicle. Communications with the array of antennas (602a, 602b, 602c . . . 602n) and the collectors (e.g., 604a, 604b, 604c . . . 604n) and storage device 606 may be exchanged over one or more communications paths but are shown as a single path in FIG. 6 to avoid overcomplicating the drawing.

The array of antennas (e.g., 602a, 602b, 602c . . . 602n) may include a plurality of antennas dispersed around the country coupled to receive broadcast content items from all terrestrial broadcast content sources. The antennas may be coupled to collectors 604 that collect all of the broadcast content items from broadcast content sources and deliver it to the storage device 606. The broadcast content items are connected to the server 608 for processing for content recognition and geographical origin determination. The broadcast content items are processed through an automated content recognition, the automated content recognition can store, allocate based on content recognition and process for presentation of the broadcast content items. The server 608 may be a collection of servers connected to the storage device for improved processing. The vehicle includes a user interface 612 and an antenna 614 that communicates with the storage device 606. All of the communication between the antennas, collectors, servers and vehicle may be through one or more networks including the Internet, a mobile phone network, mobile voice or data network (e.g., a 4G, 5G or LTE network), or other types of communications network or combinations of communications networks for in-vehicle use.

In one embodiment, user equipment may refer to components incorporated into, coupled to, or accessible by a vehicle such as vehicle 700 in FIG. 7. The vehicle 700 is equipped with a vehicle content interface application that may be used to enable/disable content options. For example, a user in vehicle 700 may use vehicle content interface component 702 to access content on the vehicle 700. In some embodiments, the vehicle content interface component 702 may be an audio system incorporated into vehicle 700 or user equipment used to access such content while using vehicle 700.

Figure 8:
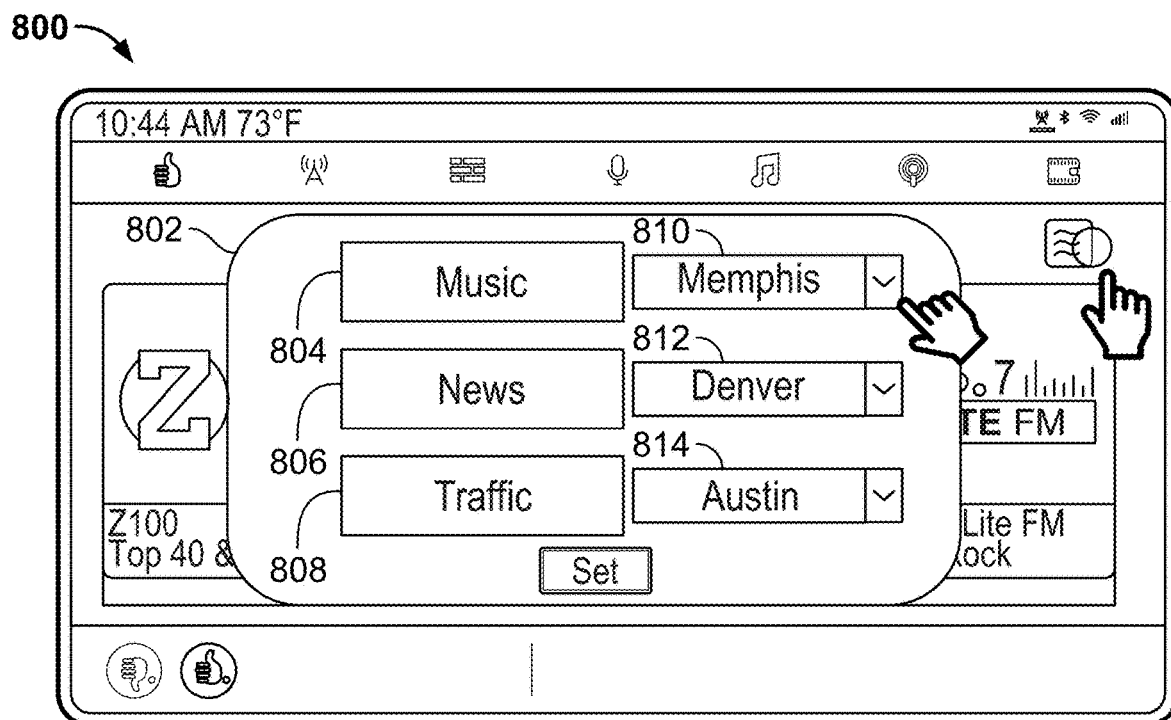
FIG. 8 depicts an illustrative example of a vehicle content interface application for displaying content in a vehicle, in accordance with one embodiment.

As discussed above, in some embodiments, a user or occupant of the vehicle 700 may select the user interface 110, 210 and 310 via a user interface (e.g., via user interface 110 (FIG. 1), 210 (FIG. 2), 310 (FIG. 3)) incorporated into or accompanying the vehicle content interface component 702 by direct input into the user interface (e.g., activating the system via user interface 110 (FIG. 1), 210 (FIG. 2) and 310 (FIG. 3). Upon a user's selection of the user interface 110, a list of audio content identifiers 804, 806, 808, 810, 812 and 814 are displayed on the display screen 800 as shown in FIG. 8. When the user or occupant of the vehicle selects one of the content identifiers via the user interface (e.g., user input interface 800 (FIG. 8) incorporated into or accompanying the vehicle content interface component 702, the selected audio content corresponding to the content identifier is displayed on the screen.

As discussed above, in some embodiments, to generate a unique playlist, a user interface 110 is displayed on the screen of the vehicle content interface component 702. In one example, a user in the vehicle 700 may select the user interface 110 incorporated into or accompanying the vehicle content interface component 702 by direct input into the user interface. Upon the user's selection of the user interface 110, a list of audio content identifiers 804, 806, 808, 810, 812 and 814 are displayed on the display screen 800 as shown in FIG. 8. When the user selects one of the content identifiers 804, 806, 808 via the user interface (e.g., user input interface 110 (FIG. 1)) incorporated into or accompanying the vehicle content interface component 702, the selected content identifiers correspond to the content type displayed on the screen. For example, the user selects the content identifiers and is prompted to select from a choice of the content types. The user is then prompted to select content identifiers for geographical origin 810, 812, 814 for the selected content type. The content identifier for content type and the geographical origin correspond to each other.

Figure 9:
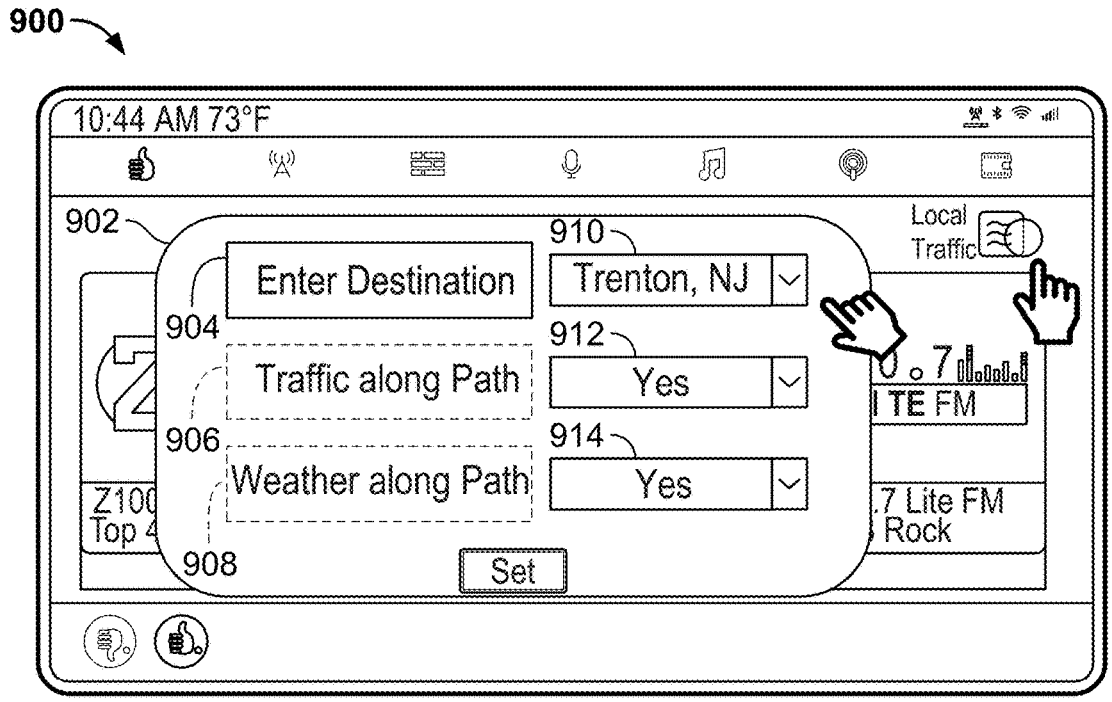
FIG. 9 depicts another illustrative example of a vehicle content interface application for displaying content in a vehicle, in accordance with one embodiment.
Figure 10:
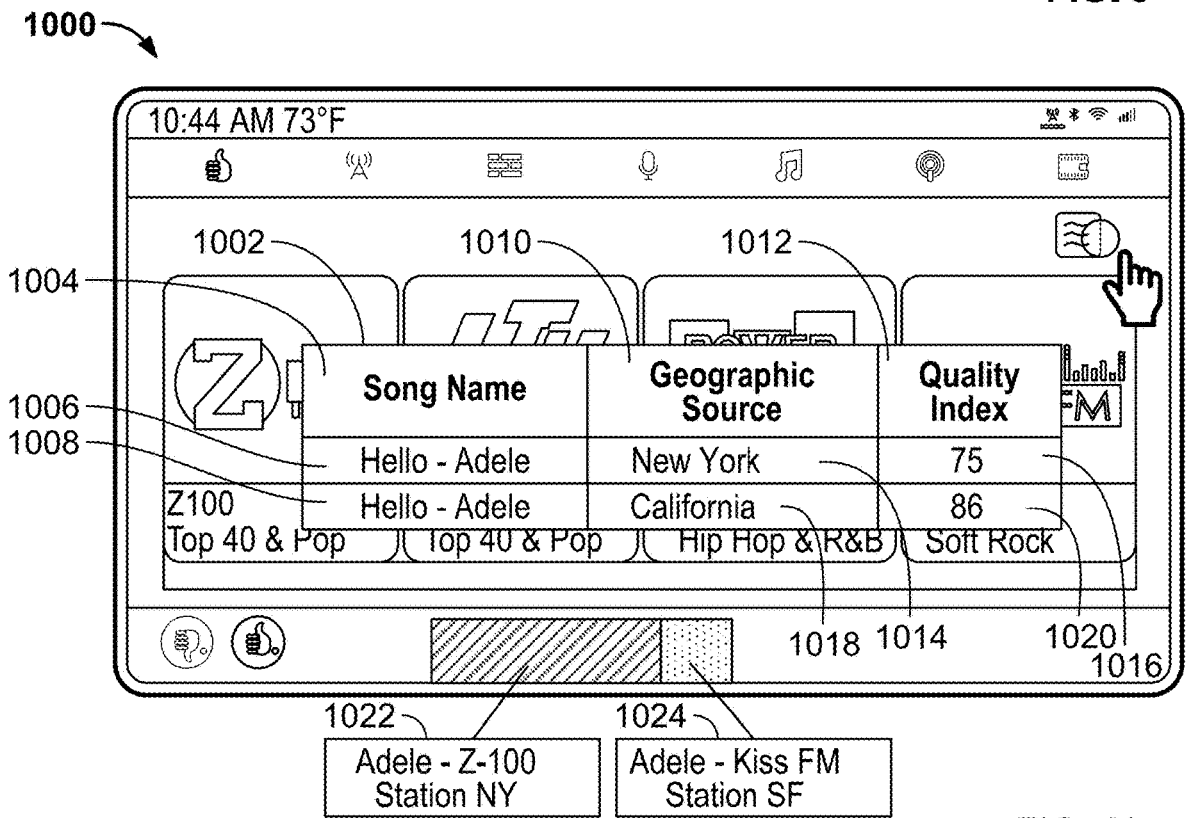
FIG. 10 depicts another illustrative example of a vehicle content interface application for displaying content in a vehicle, in accordance with one embodiment.

Upon user's selection of the user interface 210, a list of audio content identifiers 904, 906, 908, 910, 912 and 914 are displayed on the display screen 900 as shown in FIG. 9. When the user selects one of the content identifiers via the user interface (e.g., user input interface 900 (FIG. 9) incorporated into or accompanying the vehicle content interface component 702, the selected audio content corresponding to the content identifier is displayed on the screen.

As discussed above, in some embodiments, to provide relevant information to a vehicle, a user interface 210 is displayed on the screen of the vehicle content interface component 702. In one example, a user in the vehicle 700 may select the user interface 910 incorporated into or accompanying the vehicle content interface component 902 by direct input into the user interface. Upon user's selection of the user interface 210, a list of content identifiers 904, 906, 908, 910, 912 and 914 are displayed on the display screen 900 as shown in FIG. 9. When the user selects the destination identifier 904, the user is prompted to provide the address of the destination via the user interface and is further prompted to enter selections for 906, 908, 910, 912 and 914 as incorporated into or accompanying the vehicle content interface component 702, the selected content identifiers corresponding to the content type displayed on the screen and the frequency to provide the broadcast content type. For example, the user selects the content identifiers 906 and 908 and is prompted to select the frequency of the content type 912 and 914. The frequency can be to provide all broadcast content items that match the selected content type or to provide the relevant information only after a specific time period (e.g., every 10 minutes, every 30 minutes). For example, the frequency can be based on a time sequence, or based on availability of broadcast content items. In some embodiments, the user can choose for the content types 906 and 908 to be optional.

Upon the user's selection of generating playlist for a vehicle based on a specific song, a user interface 308 is prompted. The user interface 308 provides a chart 1002 with a selection of a specific song 1004 (e.g., "Hello" by Adele) sorted by geographical source 1010 and quality index 1012. The user may select one of the songs for presentation via the user interface 310.

Figure 11:
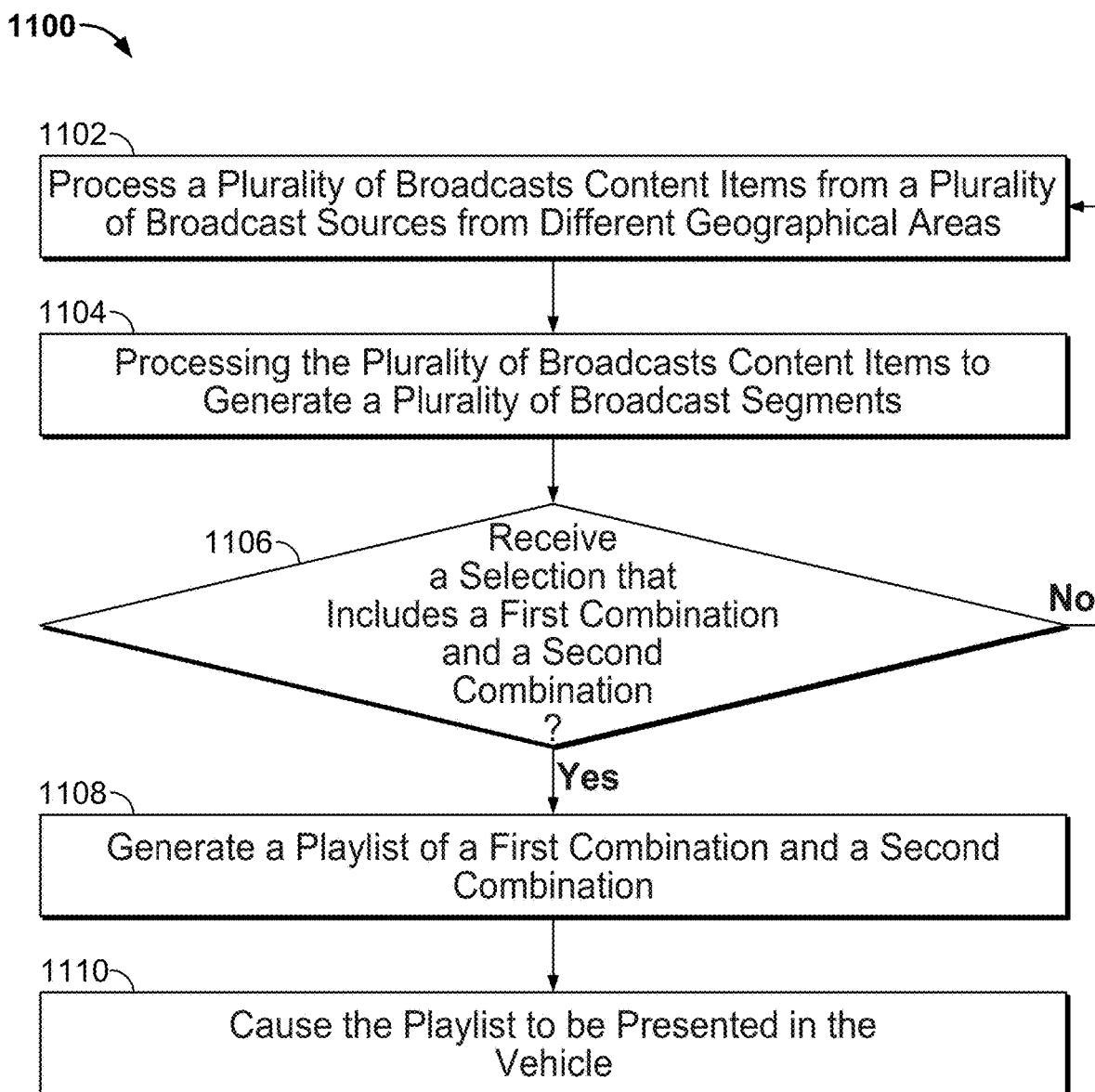
FIG. 11 depicts a flowchart of an illustrative process for generating a playlist for a vehicle based on variety of content types and geographical origins, in accordance with one embodiment.

FIG. 11 depicts a flowchart of an illustrative process 1100 generating a playlist for a vehicle, in accordance with some embodiments of the disclosure. It should be noted that process 1100 or any step thereof could be performed on, or provided by, any of the devices shown in FIGS. 4-10. For example, process 1100 may be executed by control circuitry 412 (FIG. 4) as instructed by a vehicle content interface application implemented on a user device in order to generate a playlist for a vehicle based on variety of content types and geographical origins. In addition, one or more steps of process 1100 may be incorporated into or combined with one or more steps of any other process or embodiment (e.g., process 1200 (FIG. 12), process 1300 (FIG. 13)). At 1102, the control circuitry processes plurality of broadcast content items from a plurality of broadcast sources from different geographical areas. For example, the system may receive from a user input (e.g., via user interface 110 (FIG. 1)) selecting a criterion for a playlist.

At 1104, control circuitry processes the plurality of broadcast content items to generate a plurality of broadcast segments. For example, the system may process the broadcast content items into shorter, more manageable broadcast content segments and further determine the content type and geographical origin for each broadcast content segment.

At 1106, control circuitry receives a selection that includes a first combination and a second combination. Each of the first combination and the second combination includes a content type and a geographical origin. The content type may be selected from any one of the following options including news type, music type, traffic type and weather type. If the control circuitry receives the first combination and the second combination of broadcast content items ("Yes" at 1106), then at 1108, control circuitry generates a playlist of the first combination (e.g., content type and geographical origin) and the second combination (e.g., content type and geographical origin). If, on the other hand, control circuitry does not receive the first combination and the second combination of broadcast content items ("No" at 1106), then the process 1102 and 1104 are repeated. The process of generating the playlist may include processing the plurality of broadcast segments by determining a beginning and an end of each broadcast segment corresponding to a first splice point and a second splice point for each of the broadcast segments. The process may also include scheduling the playlist by configuring the beginning of the first broadcast segment of the playlist with the beginning of the second broadcast segment to follow the end of first broadcast segment.

In response to generating the playlist at 1108, at 1110, control circuitry causes the generated playlist to be presented in the vehicle. The process may include causing each of the first broadcast segment and the second broadcast segment to be transmitted, via network for in-vehicle use.

Figure 12:
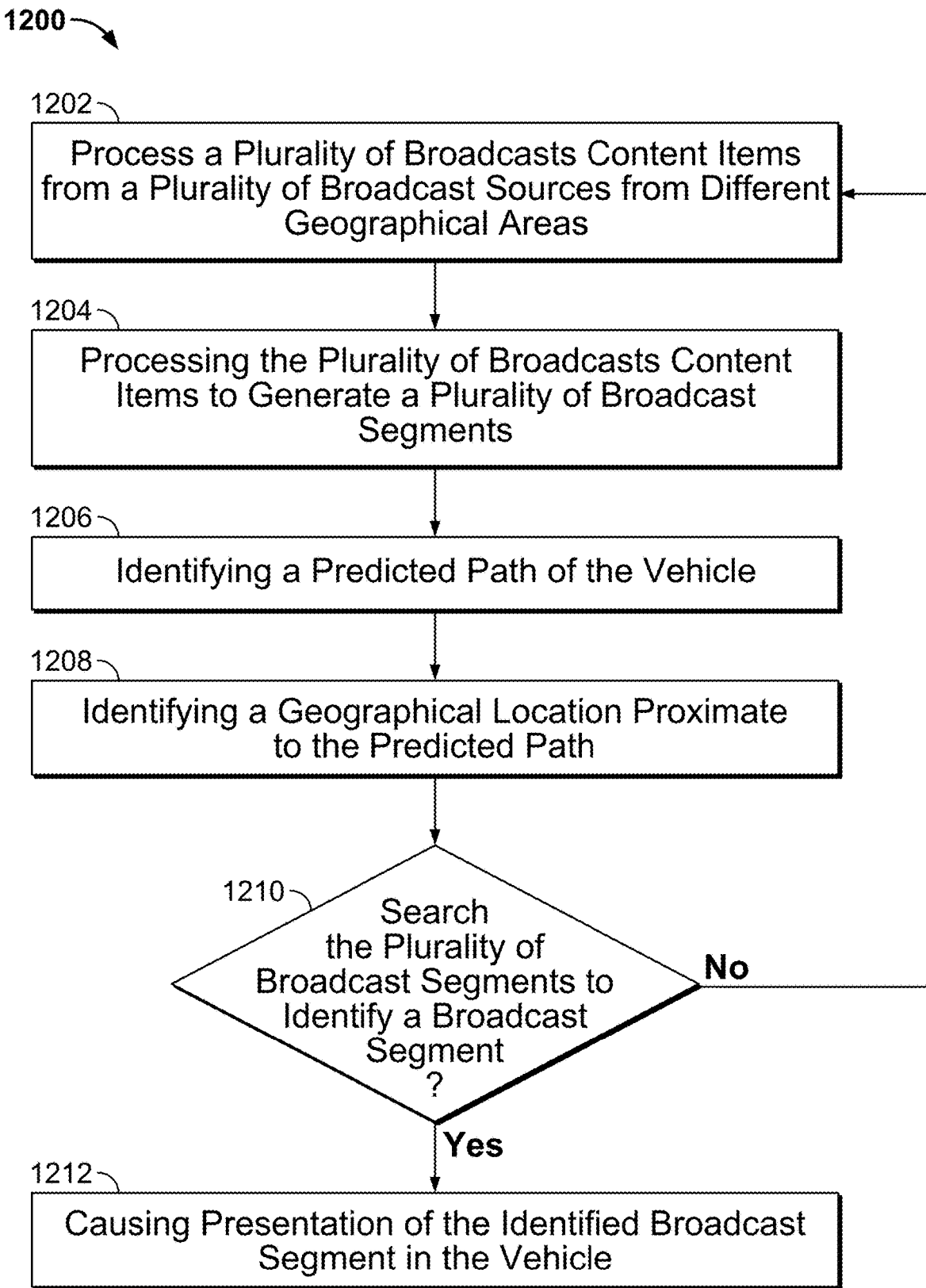
FIG. 12 depicts a flowchart of another illustrative process for providing relevant information for a vehicle, in accordance with one embodiment.

FIG. 12 depicts a flowchart of another illustrative process for providing relevant information for a vehicle, in accordance with some embodiments of the disclosure. It should be noted that process 1200 or any step thereof could be performed on, or provided by, any of the devices shown in FIGS. 4-10. For example, process 1200 may be executed by control circuitry 412 (FIG. 4) as instructed by a vehicle content interface application implemented on a user device in order to generate a playlist for a vehicle based on variety of content types and geographical origins. In addition, one or more steps of process 1200 may be incorporated into or combined with one or more steps of any other process or embodiment (e.g., process 1100 (FIG. 11), process 1300 (FIG. 13)). At 1202, the control circuitry processes a plurality of broadcast content items from a plurality of broadcast sources from different geographical areas. For example, the system may receive from a user input (e.g., via user interface 210 (FIG. 2)) selecting a criterion for relevant information.

At 1204, control circuitry processes the plurality of broadcast content items to generate a plurality of broadcast segments. For example, the system may process the broadcast content items into shorter more manageable broadcast content segments and further determine the content type and geographical origin for each broadcast content segment.

At 1206, control circuitry identifies a predicted path of the vehicle. Identifying the predicted path of the vehicle may include receiving a geographical location of the vehicle, receiving a selection of a destination of the vehicle and determining the predicted path of the vehicle based on the geographical location and the destination of the vehicle. At 1208, the system identifies a geographical location proximate to the predicted path.

At 1210, control circuitry searches for a plurality of broadcast segments to identify a broadcast segment that matches metadata of the broadcast content type with the identified geographical location. If the control circuitry identifies a broadcast segment that matches the metadata ("Yes" at 1210), then at 1212, control circuitry causes presentation of the identified broadcast segment in the vehicle. If, on the other hand, control circuitry does not identify a broadcast segment that matches the metadata ("No" at 1210), then the process 1202 is repeated. The process of generating the playlist may include processing the plurality of broadcast segments by determining a beginning and an end of each broadcast segment corresponding to a first splice point and a second splice point for each of the broadcast segments. The process may also include scheduling the playlist by configuring the beginning of the first broadcast segment of the playlist with the beginning of the second broadcast segment to follow the end of first broadcast segment.

Figure 13:
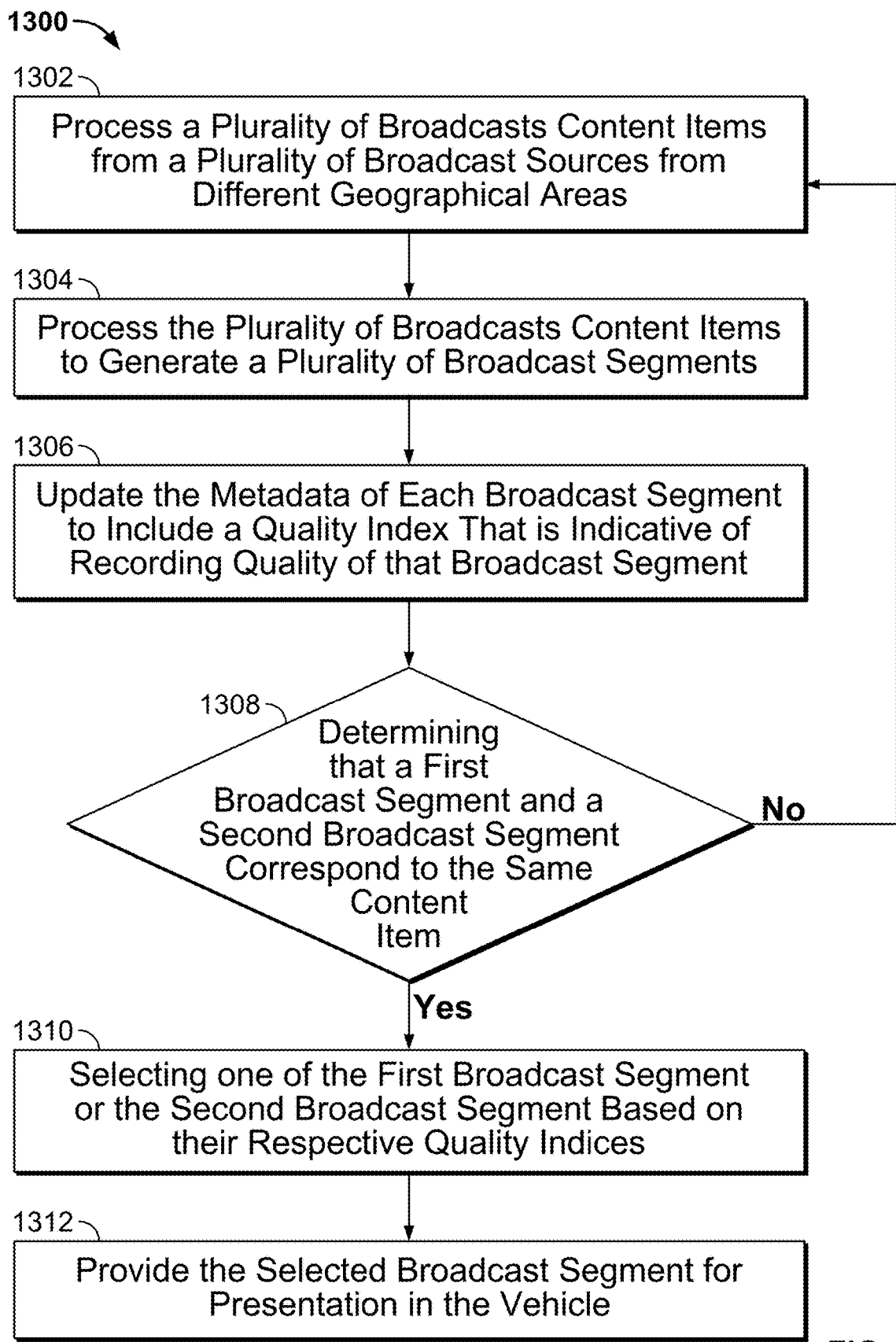
FIG. 13 depicts a illustrative flowchart of a process for generating a playlist for a vehicle based on quality index, in accordance with one embodiment.

FIG. 13 depicts an illustrative flowchart of a process for generating a playlist for a vehicle-based quality index, in accordance with some embodiments of the disclosure. It should be noted that process 1300 or any step thereof could be performed on, or provided by, any of the devices shown in FIGS. 4-10. For example, process 1300 may be executed by control circuitry 412 (FIG. 4) as instructed by a vehicle content interface application implemented on a user device in order to generate a playlist for a vehicle based on variety of content types and geographical origins. In addition, one or more steps of process 1300 may be incorporated into or combined with one or more steps of any other process or embodiment (e.g., process 1100 (FIG. 11), process 1200 (FIG. 12)). At 1302, the control circuitry processes a plurality of broadcast content items from a plurality of broadcast sources from different geographical areas. For example, the system processes the broadcast content items in response to receiving from a user input (e.g., via user interface 310 (FIG. 3)) selecting a criterion for a playlist.

At 1304, control circuitry processes the plurality of broadcast content items to generate a plurality of broadcast segments. For example, the system may process the broadcast content items into shorter, more manageable broadcast content segments to further determine the content type and geographical origin for each broadcast content segment.

At 1306, control circuitry updates metadata of each broadcast segment to include a quality index that is indicative of recording quality of that broadcast segment. Each of the broadcast segments is evaluated to determine the quality of said broadcast segment. The content type may be determined for each of the broadcast segments.

At 1308, control circuitry determines that a first broadcast segment and a second broadcast segment correspond to the same content item. If the control circuitry determines that a first broadcast segment and a second broadcast segment correspond to the same content item ("Yes" at 1308), then at 1310, control circuitry selects one of the first broadcast segment or the second broadcast segment based on their respective quality indices. If, on the other hand, control circuitry does not determine that a first broadcast segment and a second broadcast segment correspond to the same content item ("No" at 1308), then the process 1302 is repeated. At 1312, control circuitry provides the selected broadcast segment for presentation in the vehicle.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing relevant information to a vehicle, the method comprising:
  receiving a plurality of broadcast content items, wherein each respective broadcast content item of the plurality of broadcast content items is captured from a broadcast source in a respective geographical area;
  generating a plurality of broadcast segments, each broadcast segment being associated with metadata that identifies content type and geographical origin of that segment, wherein the geographical origin metadata identifies the geographical area in which the segment was captured;
  identifying a predicted path of the vehicle;
  identifying a geographical location proximate to the predicted path, wherein the identified geographical location is different from a current location of the vehicle;

searching the plurality of broadcast segments to identify a broadcast segment, wherein the geographical origin metadata of the identified broadcast segment matches the identified geographical location proximate to the predicted path and wherein the content type of the broadcast segment is one of traffic type or weather type; and causing a presentation of the identified broadcast segment that was captured in the identified geographical location proximate to the predicted path in the vehicle, wherein the presentation occurs while the vehicle is in the current location, which is different from the identified geographical location proximate to the predicted path.

2. The method of claim 1, further comprising:

processing the plurality of broadcast content items from a plurality of broadcast sources from different geographical areas.

3. The method of claim 2, wherein the processing the plurality of broadcast content items from the plurality of broadcast sources from different geographical areas comprises:

recording the plurality of broadcast content items from the plurality of broadcast sources; and processing the plurality of broadcast content items to determine for each broadcast content items metadata that identifies content type and geographical origin of that segment.

4. The method of claim 1, wherein the searching the plurality of broadcast segments comprises:

identifying the broadcast segments with geographical origin metadata that matches the identified geographical location;

processing the identified broadcast segments to determining a beginning and an end of each identified broadcast segment corresponding to a first splice point and the second splice point for each of the identified broadcast segment; and providing the identified broadcast segments for presentation as the playlist.

5. The method of claim 1, wherein processing the plurality of broadcast content items to generate the plurality of broadcast segments comprises:

processing each broadcast content item of the plurality of broadcast content items to identify content types for each broadcast segment, each broadcast segment being associated with metadata that identifies content type and geographical origin; and splicing each broadcast segment based on identified content type at a start and an end of each broadcast segment to generate the plurality of broadcast segments.

6. The method of claim 1, wherein the identifying the predicted path of the vehicle comprises:

receiving a geographical location of the vehicle;

receiving a selection of a destination of the vehicle; and determining the predicted path of the vehicle based on the geographical location and the destination of the vehicle.

7. The method of claim 1, wherein causing presentation of the identified broadcast segment comprises:

causing the identified broadcast segment to be transmitted, via network to the vehicle.

8. The method of claim 1, further comprising:

disabling the presentation of the identified broadcast segment in response to receiving a selection of a live streaming of broadcast segments from the plurality of broadcast content items.

9. A system for providing relevant information to a vehicle, the system comprising:

control circuitry configured to:

receive a plurality of broadcast content items, wherein each respective broadcast content item of the plurality of broadcast content items is captured from a broadcast source in a respective geographical area;

identify a predicted path of the vehicle;

identify a geographical location proximate to the predicted path, wherein the identified geographical location is different from a current location of the vehicle;

search the plurality of broadcast segments to identify a broadcast segment, wherein the geographical origin metadata of the identified broadcast segment matches the identified geographical location proximate to the predicted path and wherein the content type of the broadcast segment is one of traffic type or weather type; and cause a presentation of the identified broadcast segment that was captured in the identified geographical location proximate to the predicted path in the vehicle, wherein the presentation occurs while the vehicle is in the current location, which is different from the identified geographical location proximate to the predicted path.

10. The system of claim 9, wherein the control circuitry is further configured to: process the plurality of broadcast content items from a plurality of broadcast sources from different geographical areas.

11. The system of claim 10, wherein the control circuitry configured to process the plurality of broadcast content items from the plurality of broadcast sources from different geographical areas comprises:

recording the plurality of broadcast content items from the plurality of broadcast sources; and processing the plurality of broadcast content items to determine for each broadcast content items metadata that identifies content type and geographical origin of that segment.

12. The system of claim 9, wherein the control circuitry configured to search the plurality of broadcast segments comprises:

identifying the broadcast segments with geographical origin metadata that matches the identified geographical location;

processing the identified broadcast segments to determining a beginning and an end of each identified broadcast segment corresponding to a first splice point and the second splice point for each of the identified broadcast segment; and providing the identified broadcast segments for presentation as the playlist.

13. The system of claim 9, wherein the control circuitry configured to process the plurality of broadcast content items to generate the plurality of broadcast segments comprises:

processing each broadcast content item of the plurality of broadcast content items to identify content types for each broadcast segment, each broadcast segment being associated with metadata that identifies content type and geographical origin; and splicing each broadcast segment based on identified content type at a start and an end of each broadcast segment to generate the plurality of broadcast segments.

14. The system of claim 9, wherein the control circuitry configured to identify the predicted path of the vehicle comprises:
receiving a geographical location of the vehicle;
receiving a selection of a destination of the vehicle; and
determining the predicted path of the vehicle based on the geographical location and the destination of the vehicle.

15. The system of claim 9, wherein the control circuitry configured to cause presentation of the identified broadcast segment comprises:
causing the identified broadcast segment to be transmitted, via network to the vehicle.

16. The system of claim 9, wherein the control circuitry is further configured to:
disable the presentation of the identified broadcast segment in response to receiving a selection of a live streaming of broadcast segments from the plurality of broadcast content items.

17. A non-transitory computer-readable medium having instructions encoded thereon that when executed by control circuitry cause the control circuitry to:
receive a plurality of broadcast content items, wherein each respective broadcast content item of the plurality of broadcast content items is captured from a broadcast source in a respective geographical area;
identify a predicted path of the vehicle;
identify a geographical location proximate to the predicted path, wherein the identified geographical location is different from a current location of the vehicle;
search the plurality of broadcast segments to identify a broadcast segment, wherein the geographical origin metadata of the identified broadcast segment matches the identified geographical location proximate to the predicted path and wherein the content type of the broadcast segment is one of traffic type or weather type; and
cause presentation of the identified broadcast segment that was captured in the identified geographical location proximate to the predicted path in the vehicle, wherein the presentation occurs while the vehicle is in the current location, which is different from the identified geographical location proximate to the predicted path.

18. The non-transitory computer-readable medium of claim 17, further having instructions encoded thereon that when executed by the control circuitry cause the control circuitry to process the plurality of broadcast content items from a plurality of broadcast sources from different geographical areas.

19. The non-transitory computer-readable medium of claim 18, further having instructions encoded thereon that when executed by the control circuitry cause the control circuitry to process the plurality of broadcast content items from the plurality of broadcast sources from different geographical areas comprises:
recording the plurality of broadcast content items from the plurality of broadcast sources; and
processing the plurality of broadcast content items to determine for each broadcast content items metadata that identifies content type and geographical origin of that segment.

20. The non-transitory computer-readable medium of claim 17, further having instructions encoded thereon that when executed by the control circuitry cause the control circuitry to search the plurality of broadcast segments comprises:
identifying the broadcast segments with geographical origin metadata that matches the identified geographical location;
processing the identified broadcast segments to determining a beginning and an end of each identified broadcast segment corresponding to a first splice point and the second splice point for each of the identified broadcast segment; and
providing the identified broadcast segments for presentation as the playlist.

* * * * *